United States Patent
Ollander et al.

(10) Patent No.: US 10,920,899 B2
(45) Date of Patent: Feb. 16, 2021

(54) ELECTRONIC VALVE ACTUATOR WITH PREDICTIVE SELF-CALIBRATING TORQUE CONTROLLER

(71) Applicant: Flowserve Management Company, Irving, TX (US)

(72) Inventors: Mark D Ollander, Forest, VA (US); Daniel E Carlson, Rustburg, VA (US); Michael Adam Rumore, Lynchburg, VA (US)

(73) Assignee: Flowserve Management Company, Irving, TX (US)

( * ) Notice: Subject to any disclaimer, the term of this patent is extended or adjusted under 35 U.S.C. 154(b) by 85 days.

(21) Appl. No.: 16/165,043

(22) Filed: Oct. 19, 2018

(65) Prior Publication Data
US 2020/0124198 A1    Apr. 23, 2020

(51) Int. Cl.
| | |
|---|---|
| *G05B 13/00* | (2006.01) |
| *F16K 31/04* | (2006.01) |
| *F16K 37/00* | (2006.01) |
| *G05B 13/02* | (2006.01) |
| *G01M 13/021* | (2019.01) |
| *G01L 5/00* | (2006.01) |

(52) U.S. Cl.
CPC .......... *F16K 31/048* (2013.01); *F16K 31/046* (2013.01); *F16K 37/0083* (2013.01); *G01L 5/0061* (2013.01); *G01M 13/021* (2013.01); *G05B 13/026* (2013.01)

(58) Field of Classification Search
CPC .. F16K 31/048; F16K 37/0083; F16K 31/046; G01L 5/0061; G01M 13/021; G05B 13/026
See application file for complete search history.

(56) References Cited

U.S. PATENT DOCUMENTS

| | | | |
|---|---|---|---|
| 4,735,101 A | 4/1988 | Charbonneau et al. | |
| 4,816,987 A | 3/1989 | Brooks et al. | |
| (Continued) | | | |

FOREIGN PATENT DOCUMENTS

JP    2004257419 A    9/2004

OTHER PUBLICATIONS

PCT International Search Report and Written Opinion for Appl No. PCT/US2019/055206, 11 pages.

*Primary Examiner* — Paul B Yanchus, III
(74) *Attorney, Agent, or Firm* — Maine Cemota & Rardin

(57) ABSTRACT

An electronic controller of a valve actuator predictively calculates motor inputs that will cause the actuator to apply desired forces or torques to a valve. A force/torque sensor of the actuator measures applied force or torque at the motor output and/or valve to verify the applied force or torque and enable updating of calibration settings as needed. Upon failure of the force/torque sensor, embodiments continue predictive operation without sensor verification or calibration updates. Upon failure of the predictive control, embodiments continue valve actuation under reactive control via the force/torque sensor. Connection to a calibration valve simulator enables embodiments to perform an initial self-calibration using the force/torque sensor of the actuator. The motor can be a variable frequency driven AC motor or a DC motor. The calibration can incorporate mechanical properties of an actuator gear train.

19 Claims, 2 Drawing Sheets

(56) References Cited

U.S. PATENT DOCUMENTS

| | | | | |
|---|---|---|---|---|
| 5,594,175 A | * | 1/1997 | Lyon | F16K 31/04 |
| | | | | 73/593 |
| 6,161,438 A | * | 12/2000 | Mullet | E05F 15/41 |
| | | | | 73/774 |
| 6,279,870 B1 | | 8/2001 | Welz, Jr. et al. | |
| 9,086,335 B2 | * | 7/2015 | Dolenti | G01M 15/046 |
| 10,082,216 B1 | * | 9/2018 | Van Derven | H02P 8/12 |
| 2009/0011899 A1 | * | 1/2009 | Reuschel | F16D 48/06 |
| | | | | 477/5 |
| 2009/0230338 A1 | | 9/2009 | Sanders et al. | |
| 2015/0239554 A1 | * | 8/2015 | Birchette | B64C 25/58 |
| | | | | 244/104 FP |
| 2018/0187790 A1 | * | 7/2018 | Schmidt | G05B 15/02 |
| 2018/0266068 A1 | * | 9/2018 | Rines | E02B 3/20 |
| 2018/0313570 A1 | * | 11/2018 | Thoni | F24F 11/30 |
| 2018/0364116 A1 | * | 12/2018 | Gilbert | G01L 3/109 |
| 2019/0190422 A1 | * | 6/2019 | Ghaderi | B62D 5/04 |
| 2020/0063890 A1 | * | 2/2020 | Senkyr | F16K 37/0041 |
| 2020/0081410 A1 | * | 3/2020 | Walker | G05B 19/406 |

* cited by examiner

ELECTRONIC VALVE ACTUATOR WITH PREDICTIVE SELF-CALIBRATING TORQUE CONTROLLER

FIELD OF THE INVENTION

The invention relates to control actuators such as valve actuators, and more particularly, to electronically controlled, motor-driven, variable torque valve actuators.

BACKGROUND OF THE INVENTION

Control valves and valve actuators find wide application in a number of industries, such as power generation of all types, petroleum and petrochemicals, textiles, paper, and food processing. Control valves are often used to directly and/or indirectly control temperatures, pressures, and flows within an open or closed-loop system. The operation of a control valve typically involves positioning a plug relative to a stationary seat within the valve, whereby the actuator is directly coupled to the valve plug via a stem that is used to move the valve plug to the desired control position. The action of the valve can be either linear or rotary, depending on whether the valve is a liner or rotary valve.

It should be noted that frequent reference is made herein to "torque" applied by an actuator to a valve. However, it will be understood that, unless otherwise required by context, the term "torque" as used herein also refers to linear displacement force, according to whether the implementation of the valve actuator is rotary or linear. Similarly, valve actuation "speed" can refer to either linear or rotational speed, according to the configuration of the valve and actuator. Furthermore, it should be understood that the term valve "stem" as used herein is not limited to rotationally operated valve stems, but refers generically to any mechanical element of a valve that is manipulated by a valve actuator so as to adjust a degree to which the valve is open or closed.

In the simplest case, a valve actuator can be purely mechanical. However, it is often convenient to electrically control a valve actuator, for any of several reasons, for example to provide remote control and/or monitoring. This can allow the valve to be located in a remote, dangerous, flammable, and/or toxic environment, and/or in a location that is inconvenient or difficult to reach.

The remote control of an electric valve actuator can be "manual," for example by adjustment of a potentiometer. In other cases the function of the valve actuator includes onboard control electronics that enable the actuator to perform more complex tasks without requiring immediate, local, human intervention, such as process control, regulation, implementation of speed/torque profiles, and/or emergency shut-off. For many of these applications, the operating speed and force or torque provided by a valve actuator are important parameters.

The speed and torque/force that are applied by a valve actuator to a valve can be controlled in many ways. In the simplest case, if a constant actuation torque and speed are required, a fixed speed motor can be coupled to a gear set to provide just the right combination of speed and torque to a valve. However, this approach requires that the manufacturer must carefully select and combine an appropriate motor and gear set so as to provide an actuator with optimal torque and speed. If a manufacturer wants to have a quick turnaround time to customer orders, this in turn requires the manufacturer to stock a wide variety of motors and gear sets. Additionally, a specialized workforce must be employed that is knowledgeable in the assembly of sometimes hundreds of different variations on a single generic valve actuator design.

Another disadvantage of this approach is that if it becomes necessary to change the torque and speed characteristics of a valve actuator, due to a change or re-evaluation of the valve requirements, the actuator must be pulled from service, disassembled, and then reassembled with a different gear set and/or motor.

There are many applications where it is desirable to vary the speed and torque of the actuator over the range of actuation and/or due to feedback, process control requirements, or other control conditions. For example, heat exchangers are a common type of closed-loop control application that can require variable control and regulation of water, steam and condensate. And even if a constant actuation speed is desired, it may be necessary to vary the applied torque over the actuation range according to a specific torque profile so as to obtain the desired constant actuation speed.

Accordingly, it is often desirable to provide a valve actuator having a controller and motor that can provide variable output speed/torque. One of the critical requirements for many electronically controlled, motor-driven actuators with variable speed/torque is to limit the maximum force or torque that is applied while moving the stem of a flow control valve to a commanded position. Furthermore, in many applications it is desirable to apply torque according to a specified speed/torque profile as the valve is actuated. It may even be necessary to control the applied speed/torque according to process control feedback or other control signals.

There are many different valve designs and sizes, each having its own unique force or torque characteristics and limitations. One challenge for an actuator manufacturer is therefore to design an actuator that can accurately control the torque and position the valve according to specific operational requirements.

One approach is to include a torque or force sensing device between the motor and associated gear train, and/or between the gear train and the valve, and for the controller to regulate the applied torque according to the measured values. For example, the sensing device can be:

A spring pack that is mechanically adjusted to close a set of contacts when a specified maximum force or torque is reached, thereby sending a signal to the electronic controller indicating that the maximum force or torque level has been achieved; or An electronic device such as a strain gage that dynamically measures the torque or force and transmits an analog signal to the electronic controller that represents the force or torque measurement, so that the control system can take appropriate control actions.

It is notable that this sensor-regulated approach is essentially reactive, in that the controller operates according to measured values of a torque that has already been applied to the valve. As such, the possibility exists that there may be a measurement and mechanical latency, such that a dangerous level of force or torque may be applied to the valve before the electronic controller and can react.

Another approach is to implement software algorithms and logic in the electronic controller that will calculate motor settings based on a pre-calibrated speed/torque profile for the valve and actuator, and will cause the controller to apply the calculated settings to the electric motor, thereby causing the motor to apply the desired/required motor torque. Rather than allowing the motor to operate at its full capacity, this approach essentially throttles the electric motor energy so as to control and limit the torque output of the motor. Of course, an essential prerequisite for this approach is to accurately measure the motor electrical characteristics and the mechanical gear properties of the system so as to create a reliable profile that can be entered into the control algorithm.

Examples of this approach include:

A sensor-less motor, whereby the electronic controller is required to predict the orientation of the motor rotor with respect to the motor stator at each moment in time, based on the actuation history, and to energize the motor accordingly to generate the desired torque.

A motor that includes a rotor position sensor that measures the rotor position of the motor with respect to the stator of the motor, and energizes the motor accordingly so as to generate the desired torque.

It is notable that this motor drive control approach is essentially predictive, in that the motor settings are calculated and implemented based on a pre-defined valve and actuator profile before the force or torque is actually applied, rather than in response to a force or torque that has already been applied and measured. While this approach avoids control "overshoot" due to measurement and reaction delay times, the possibility exists that the motor and/or gear train characteristics may change over time, and/or the system may lose its calibration, such that the predicted valve position and/or applied torque is no longer accurate.

A further disadvantage of all of these approaches is that they are not fault-tolerant, in that a failure of the force/torque control system may lead to damage of the valve.

What is needed, therefore, is an apparatus and method of controlling and limiting the force or torque applied by an electronically controlled, motor-driven valve actuator to a valve that is predictive, accurate over extended operational lifetimes, and fault-tolerant.

SUMMARY OF THE INVENTION

The present invention is an apparatus and method of controlling and limiting the force or torque applied by an electronically controlled, motor-driven valve actuator to a valve that is predictive, i.e. non-reactive, accurate over an extended operational lifetime, and fault-tolerant. According to the invention, the electronically controlled, motor-driven actuator includes an electric motor drive technology, including output current and/or voltage sensors, that enables calibrated electronic control of the motor output torque. In embodiments, the actuator includes an AC motor that is driven by a variable frequency motor drive with field oriented control. In other embodiments, the valve actuator includes a DC motor controlled by a variable DC motor drive. The actuator controls and limits the force or torque that is applied to a valve according to a control algorithm that is based on specified motor electrical characteristics and, in embodiments, also on mechanical gear train properties of the actuator system.

The valve actuator of the present invention further includes at least one torque measurement sensor, which is configured to directly or indirectly monitor the force or torque applied to the valve, and to relay its measurements to the electronic controller.

The method of the present invention includes performing an initial calibration of applied force or torque as a function of motor control parameters before the valve actuator is put into service. In some embodiments, the calibration is manually performed, and the results are entered into a calibration table of the actuator. In other embodiments, this initial calibration is performed by connecting the valve actuator to a test apparatus, such as a torque stand, and allowing the electronic controller to self-calibrate the actuator by applying varying degrees of torque to the test apparatus, and using the incorporated torque measurement sensor to record the applied torque for each of a plurality of motor control parameter settings. In some of these embodiments, the torque stand communicates directly with the actuator, while in other embodiments an operator enters the values measured by the torque stand into the calibration table of the actuator.

Once the valve actuator has been calibrated and put in to service, the disclosed method includes predictive control of the force or torque applied to the valve, by controlling the motor according to the calibration parameters.

The method further includes simultaneous, reactive monitoring of the force or torque that is applied to the valve, by periodic or continuous, direct or indirect, measurement by the torque measurement sensor of the force or torque that is applied to the valve, and reporting of the measured, applied force or torque to the electronic controller. According to the measurements of applied force or torque, the electronic controller periodically or continuously updates and modifies the calibration parameters, as needed, so as to maintain accurate, predictive control over the applied force or torque despite any wear, temperature drift, voltage drift, or any other source of short or long term calibration inaccuracy that may occur. Accordingly, the output speed and/or torque is directly regulated, at least in part, according to feedback provided by the output current and/or voltage sensors of the motor controller, while the accuracy of the actuator calibration table is verified and updated by the measurements made by the torque measurement sensor.

Embodiments are further configured to detect a failure of either the predictive control system or the reactive control system, and upon detection of a failure to rely exclusively on the modality that has not failed for continued control and limiting of applied force or torque, until the failure is repaired.

Failures in the reactive measurement system can be detected, for example, if the electronic controller no longer receives measurements from the torque measurement sensor, or if the received measurements are consistently zero, even when the motor is energized, or if they fall outside of a specified "operational" range of values. For example, embodiments determine that the torque measurement system has failed if the reported force or torque is consistently report zero output current or voltage even when the motor is energized, register full scale even when the motor is not energized, or otherwise report unrealistic values and/or values that are outside of a specified range of operational values.

Similarly, embodiments determine that the predictive control has failed if the output current and/or voltage sensors of the motor controller fail to report current or voltage values, consistently report zero output current or voltage even when the motor is energized, register full scale even when the motor is not energized, or otherwise report unrealistic values and/or values that are outside of a specified range of operational values.

It should be noted that except where context dictates otherwise, the terms "force" and "torque" are used interchangeably herein to refer to the degree of mechanical actuation that is applied to the valve. For example, the "torque measurement sensor" in embodiments can measure a linear force that is applied to the valve, and not a torque, according to the requirements of the embodiment. Similarly, the term electric "motor" is not limited herein to a conventional, electric rotary motor, but can include any device that converts electrical electric energy into mechanical energy, including but not limited to solenoid actuators that are configured to provide a linear output force.

In addition, the terms "gears" and "gear train" are used broadly herein to refer to any mechanical mechanism that alters a magnitude, direction, and/or type of mechanical force, torque, and/or speed e.g. by changing the rotation axis, direction, and/or magnitude of a rotational torque, by converting a linear force to a rotational torque, and/or by converting a rotational torque to a linear force. While such "gears" and "gear trains" are recited herein in reference to certain embodiments, the present invention is not limited to embodiments that include such "gears" or "gear trains."

A first general aspect of the present invention is an electronically controlled, electric motor-driven valve actuator. The actuator includes an electronic controller, an electric motor configured to cause a linear or rotational actuation of a valve according to a motor input received from the electronic controller, whereby application of said motor input to said electric motor determines a motor output force or torque that causes a valve force or torque to be applied to apparatus external to the actuator and in mechanical communication with the valve; and a torque sensor configured to measure a sensed force or torque that is related to the valve force or torque. The electronic controller is configured to:
  a. store a motor configuration parameter set and a valve control requirement, wherein said valve control requirement includes a required force or torque to be applied to the valve;
  b. according to the stored motor configuration parameter set, determine a predicted motor input that, when applied to the electric motor, is predicted to cause the required force or torque to be applied to the valve;
  c. determine a predicted sensed force or torque that will be measured by the torque sensor when the required force or torque is applied to the valve;
  d. apply the predicted motor input to the electric motor;
  e. receive from the torque sensor a measured sensed force or torque;
  f. compare the measured sensed force or torque with the predicted sensed force or torque; and
  g. if a difference between the measured sensed force or torque and the predicted sensed force or torque exceeds a specified limit, modify the stored motor configuration parameter set according to the difference between the measured sensed force or torque and the predicted sensed force or torque.

Embodiments further include a gear train configured to convert the motor output force or torque into the valve force or torque, and wherein the motor configuration parameter set includes parameters relevant to mechanical properties of the gear train.

In any of the above embodiments, the sensed force or torque can be substantially equal to the motor output force or torque, or to the valve force or torque.

In any of the above embodiments, the valve actuator can include a plurality of torque sensors, wherein a first of the torque sensors is configured to measure a first sensed force or torque that is substantially equal to the motor output force or torque, while a second of the torque sensors is configured to measure a second force or torque that is substantially equal to the valve force or torque.

In any of the above embodiments, the electric motor can be driven by alternating current, and can be controlled by a variable frequency motor drive with field oriented control, or the electric motor can be driven by direct current, and can be controlled by a variable direct current source.

In any of the above embodiments, the electronic controller can be further configured to determine an initial motor control parameter set, said determination including sequentially applying a plurality of motor inputs to the electric motor, and for each of the applied motor inputs recording a corresponding sensed force or torque as measured by the sensor.

In any of the above embodiments, the electronic controller can be configured to periodically or continuously repeat steps b through g. In some of these embodiments, the electronic controller is further configured to detect a failure of the torque sensor, and upon said failure detection to continue repeating steps b through d. In some of these embodiments the electronic controller is configured to determine that the torque sensor has failed when the electronic controller does not receive an expected measured sensed force or torque, or if a measured sensed force or torque received from the sensor is outside of a specified range of operational values.

In any of the above embodiments wherein the electronic controller is configured to periodically or continuously repeat steps b through g, the predicted motor input applied to the electric motor can include a current or voltage applied to the electric motor according to a current or voltage measurement provided by a current or voltage sensor, and wherein, upon detection that the current or voltage sensor has failed, the electronic controller is further configured to implement reactive control of the electric motor based on the measured sensed forces or torques.

Any of the above embodiments can further include a valve position sensor configured to measure a position of the valve and communicate the measured valve position to the electronic controller.

Any of the above embodiments can further include a rotor position sensor configured to measure a rotational position of a rotor included in the electric motor, and to communicate the measured rotor position to the electronic controller.

A second general aspect of the present invention is a method of actuating a control valve. The method includes providing a valve actuator comprising an electronic controller, an electric motor configured to cause a linear or rotational actuation of a valve according to a motor input received from the electronic controller, whereby application of said motor input to said electric motor determines a motor output force or torque that causes a valve force or torque to be applied to the valve, and a torque sensor configured to measure a sensed force or torque that is related to the valve force or torque. The method further includes causing the electronic controller to:
  h. store a motor configuration parameter set and a valve control requirement, wherein said valve control requirement includes a required force or torque to be applied to the valve;
  i. according to the stored motor configuration parameter set, determine a predicted motor input that, when applied to the electric motor, is predicted to cause the required force or torque to be applied to the valve;
  j. determine a predicted sensed force or torque that will be measured by the torque sensor when the required force or torque is applied to the valve;
  k. apply the predicted motor input to the electric motor;
  l. receive from the torque sensor a measured sensed force or torque;
  m. compare the measured sensed force or torque with the predicted sensed force or torque; and n. if a difference between the measured sensed force or torque and the predicted sensed force or torque exceeds a specified limit, modify the stored motor configuration parameter set according to the difference between the measured sensed force or torque and the predicted sensed force or torque.

In embodiments, the method further comprises causing the electronic controller to determine an initial motor control parameter set, said determination including sequentially applying a plurality of motor inputs to the electric motor, and for each of the applied motor inputs recording a corresponding sensed force or torque as measured by the torque sensor.

In any of the above embodiment, the method can further include causing the electronic controller to periodically or continuously repeat steps b through g.

Some of these embodiments further include determining by the electronic controller if the torque sensor has failed, and upon determining that the torque sensor has failed, continuing to repeat steps b through d.

And in any of the above embodiment, the predicted motor input applied to the electric motor can include a current or voltage applied to the electric motor according to a current or voltage measurement provided by a current or voltage sensor, and wherein the method further comprises, upon detection that the current or voltage sensor has failed, implementing reactive control of the electric motor based on the measured sensed forces or torques.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
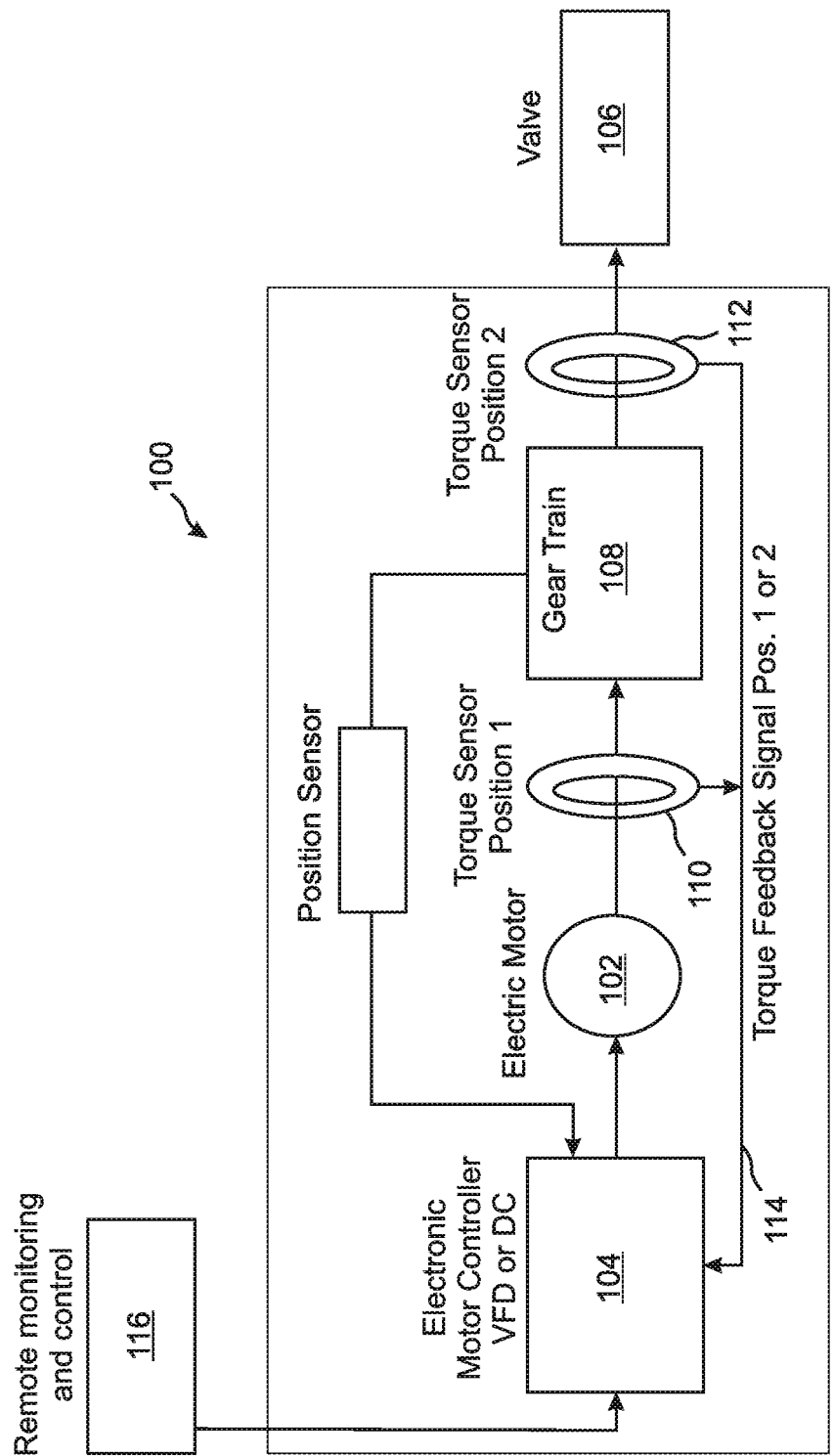
FIG. 1 is a block diagram illustrating an embodiment of the actuator of the present invention.

The present invention is an apparatus and method of controlling and limiting the force or torque applied by an electronically controlled, motor-driven valve actuator to a valve that is predictive, accurate in the near and long term, and fault-tolerant. With reference to FIG. 1, the electronically controlled, motor-driven actuator 100 includes an electric motor 102 that is controlled by a motor controller 104 that is able to electronically control the output torque of the motor 102 according to output current and/or voltage sensors included in or otherwise in communication with the motor controller 104.

The motor 102 may be any suitable motor known in the art. Numerous types of motor are included within the scope of the present invention. Virtually any AC motor can be included, including a single-phase or poly phase induction motor. The variable speed/torque motor 102 can be another type of AC motor, such as a wound rotor motor, multi-speed motor, constant or variable torque motor, or universal motor. The scope of the present invention further includes synchronous motors, such as non-excited synchronous motors, both hysteresis and reluctance designs, and DC-excited synchronous motors. The variable-speed motor 102 may also be a servo motor, brushless servomotor, and/or linear motor.

The motor controller 104 can be any controller capable of controlling the speed and torque of variable-speed motor 102. For example, the motor controller 104 can be a solid-state controller. It should be noted that the term "controller" is used herein to refer to both controllers and drives.

Generally, for the above-recited types of motors, the motor output torque will be approximately directly proportional to the current fed to the motor 102, while the motor speed will be approximately proportional to the applied voltage. Therefore, controlling the voltage that is fed to the motor 102 will control the speed of the motor 102, while controlling the current will control the motor torque.

According to the present invention, the motor controller 104 controls and limits the force or torque that is applied to a valve 106 by the motor 102 according to a control algorithm that is based on specified motor electrical characteristics and, in embodiments, also on mechanical properties of a gear train 108 of the actuator system 100. The motor controller 104 can be any suitable controller that is capable of controlling the speed and/or torque of an AC or DC motor known in the art.

The valve actuator 100 of the present invention further includes at least one torque measurement sensor 110, 112. FIG. 1 indicates two possible locations 110, 112 where the torque measurement sensor can be located, depending on whether the torque sensor is configured to directly monitor 112 the force or torque applied to the valve 106, or whether it is configured 110 to monitor the force or torque output of the electric motor 100 that is applied to the gear train 108. Both of the torque measurement sensors 110, 112 in the embodiment of FIG. 1 relay their measurements 114 to the electronic motor controller 104. In the embodiment of FIG. 1, the valve actuator 100 can be controlled and monitored remotely 116. Similar embodiments can be controlled locally in addition to, or instead of, being remotely controlled.

Figure 2:
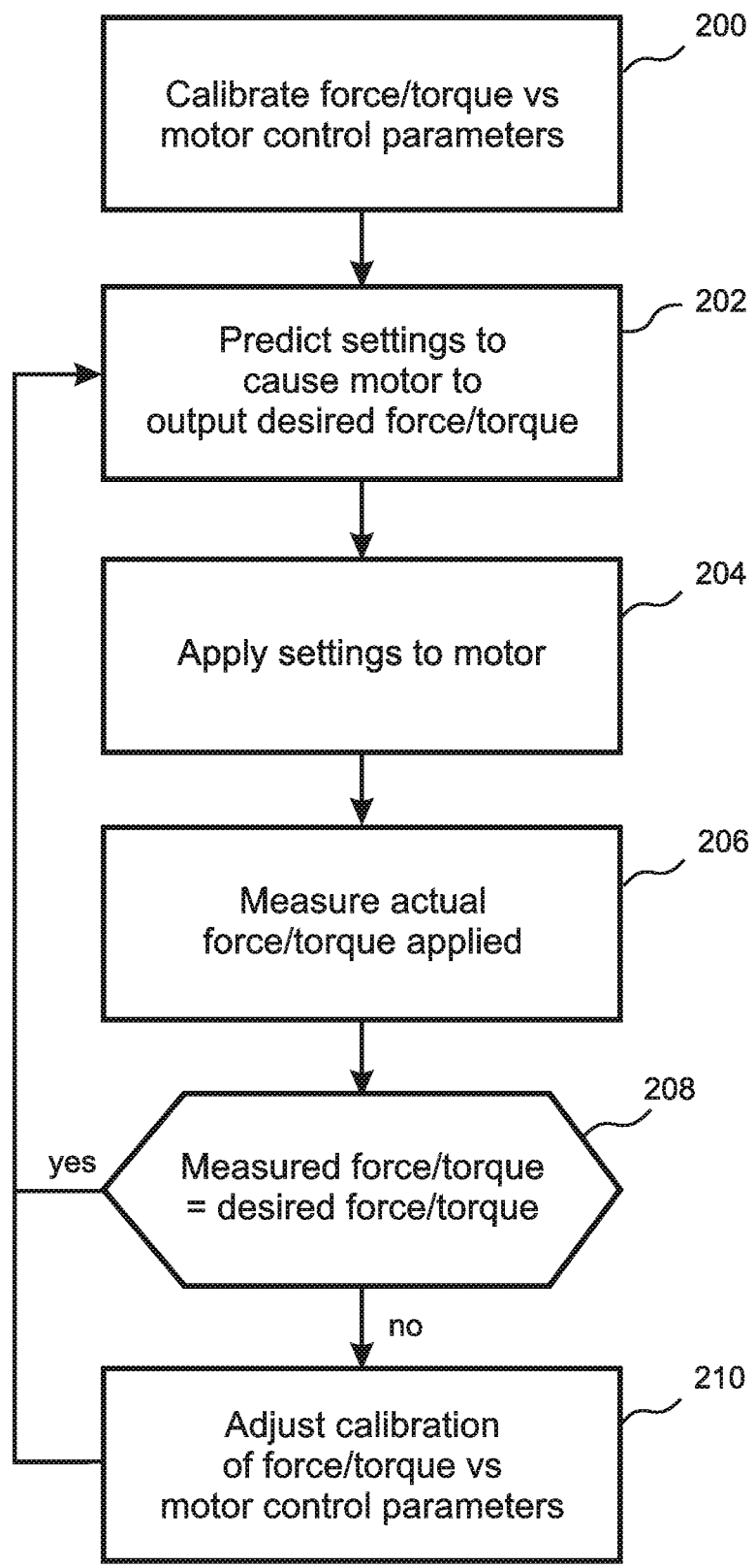
FIG. 2 is a flow diagram illustrating a method embodiment of the present invention.

With reference to FIG. 2, the method of the present invention includes performing an initial calibration 200 before the valve actuator is put into service of the force or torque that is applied to the valve 106 as a function of motor control parameters. In some embodiments, the calibration is manually performed, and the results are entered into a calibration table of the actuator. In other embodiments, this initial calibration is performed by connecting the valve actuator to a test apparatus, such as a "torque stand," and allowing the electronic controller to self-calibrate the actuator by applying varying degrees of torque to the test apparatus, and using the incorporated torque measurement sensor to record the applied torque for each of a plurality of motor control parameter settings. In some of these embodiments, the torque stand communicates directly with the actuator, while in other embodiments an operator enters the values measured by the torque stand into the calibration table of the actuator.

According to the embodiment, the initial calibration can be performed for each unit before installation, or a single calibration can be applied to each identical unit in a series, whereby any small variances between units will be self-corrected during service according to measurements made by the torque sensor.

Once the valve actuator has been calibrated and put in to service, the disclosed method includes predictive control of the force or torque applied to the valve, whereby the controller 104 uses the calibration of the motor parameters to predict the motor control settings 202 that will cause the motor 102 to produce a desired force or torque, or move to a desired rotary or linear position without exceeding a specified maximum torque.

The predicted motor control settings are then applied 204 to the motor 102. Once the motor 102 has responded by applying a force or torque to the valve 106, the electronic controller 104 receives 206 actual, measured values of the applied force or torque from the one or more torque measurement sensors 110, 112. If the actual, measured force or torque that was applied to the valve 106 is substantially equal to the desired force or torque 208, then control of the valve continues. However, if the measured force or torque that was applied to the valve 106 is not substantially equal to the desired force or torque, then the measured value(s) is/are used to update the calibration of the motor parameters 210.

Depending on the embodiment, the measurement and re-calibration of the motor parameters can be performed, for example, after each discrete application of force or torque to the valve 106, or on a continuous or periodic basis if the valve is being actuated continuously. In this manner, the accuracy of the motor calibration is maintained and assured to be accurate, thereby minimizing any chance that the predicted settings could be sufficiently in error to cause damage to the valve, even if there is wear, temperature drift, voltage drift, or any other source of short or long term process that might otherwise introduce error into the calibration.

Embodiments are further configured to detect a failure of either the predictive control system or the reactive control system, and upon detection of a failure, to rely exclusively on the modality that has not failed for continued control and limiting of applied force or torque, until the failure is repaired.

Failures in the reactive measurement system can be detected, for example, if the electronic controller 104 no longer receives measurements from the torque measurement sensor(s) 110, 112, if the received measurements are consistently zero, even when the motor 102 is energized, if the measurements are consistently the same value, even when the motor energization is changing, or if the received measurements fall outside of a specified "operational" range of values. For example, embodiments determine that the torque measurement system has failed if the reported force or torque is always zero, always at full scale, or are otherwise unresponsive to the motor control.

Similarly, embodiments determine that the predictive control has failed if the output current and/or voltage sensors of the motor controller fail to report current or voltage values, consistently report zero output current or voltage even when the motor is energized, consistently register full scale, or otherwise report unrealistic values and/or values that are outside of a specified range of operational values.

It should be noted that except where context dictates otherwise, the terms "force" and "torque" are used interchangeably herein to refer to the degree of mechanical actuation that is applied to the valve. For example, the "torque measurement sensor" in embodiments can measure a linear force that is applied to the valve, and not a torque, according to the requirements of the embodiment. Similarly, the term electric "motor" is not limited herein to a conventional, electric rotary motor, but can include any device that converts electrical electric energy into mechanical energy, including but not limited to solenoid actuators that are configured to provide a linear output force.

In addition, the terms "gears" and "gear train" are used broadly herein to refer to any mechanical mechanism that alters a magnitude, direction, speed, and/or type of mechanical force or torque, e.g. by changing the rotation axis, direction, and/or amplitude of a rotational torque, by converting a linear force to a rotational torque, and/or by converting a rotational torque to a linear force. While such "gears" and "gear trains" are recited herein in reference to certain embodiments, the present invention is not limited to embodiments that include such "gears" or "gear trains."

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. An electronically controlled, electric motor-driven valve actuator, comprising:
   an electronic controller;
   an electric motor configured to cause a linear or rotational actuation of a valve according to a motor input received from the electronic controller, whereby application of said motor input to said electric motor determines a motor output force or torque that causes a valve force or torque to be applied to the valve; and
   a torque sensor configured to directly or indirectly measure the valve force or torque by measuring a sensed mechanical force or torque that results from application of an electric voltage or current to the electric motor;
   said electronic controller being configured to:
   A) store a motor configuration parameter set and a valve control requirement, wherein said valve control requirement includes a required force or torque to be applied to the valve;
   B) according to the stored motor configuration parameter set, determine a predicted motor input that, when applied to the electric motor, is predicted to cause the required force or torque to be applied to the valve;
   C) determine a predicted sensed force or torque that will be measured by the torque sensor when the required force or torque is applied to the valve;
   D) apply the predicted motor input to the electric motor;
   E) receive from the torque sensor a measured sensed force or torque;
   F) compare the measured sensed force or torque with the predicted sensed force or torque; and
   G) if a difference between the measured sensed force or torque and the predicted sensed force or torque exceeds a specified limit, modify the stored motor configuration parameter set according to the difference between the measured sensed force or torque and the predicted sensed force or torque.

2. The valve actuator of claim 1, further comprising a gear train configured to convert the motor output force or torque into the valve force or torque, and wherein the motor configuration parameter set includes parameters relevant to mechanical properties of the gear train.

3. The valve actuator of claim 1, wherein the sensed force or torque is the motor output force or torque.

4. The valve actuator of claim 1, wherein the sensed force or torque is the valve force or torque.

5. The valve actuator of claim 1, wherein the valve actuator includes a plurality of torque sensors, wherein a first of the torque sensors is configured to measure the motor output force or torque, while a second of the torque sensors is configured to measure the valve force or torque.

6. The valve actuator of claim 1, wherein the electric motor is driven by alternating current, and is controlled by a variable frequency motor drive with field oriented control.

7. The valve actuator of claim 1, wherein the electric motor is driven by direct current, and is controlled by a variable direct current source.

8. The valve actuator of claim 1, wherein the electronic controller is further configured to determine an initial motor control parameter set, said determination including sequentially applying a plurality of motor inputs to the electric motor, and for each of the applied motor inputs recording a corresponding sensed force or torque as measured by the torque sensor.

9. The valve actuator of claim 1, wherein the electronic controller is configured to periodically or continuously repeat steps B) through G) of claim 1.

10. The valve actuator of claim 9, wherein the electronic controller is further configured to detect a failure of the torque sensor, and upon said failure detection to continue repeating steps B) through D) of claim 1.

11. The valve actuator of claim 10, wherein the electronic controller is configured to determine that the torque sensor has failed when the electronic controller does not receive an expected measured sensed force or torque, or if a measured sensed force or torque received from the sensor is outside of a specified range of operational values.

12. The valve actuator of claim 9, wherein the predicted motor input applied to the electric motor includes a current or voltage applied to the electric motor according to a current or voltage measurement provided by a current or voltage sensor, and wherein, upon detection that the current or voltage sensor has failed, the electronic controller is further configured to implement reactive control of the electric motor based on the measured sensed forces or torques.

13. The valve actuator of claim 1, further comprising a valve position sensor configured to measure a position of the valve and communicate the measured valve position to the electronic controller.

14. The valve actuator of claim 1, further comprising a rotor position sensor configured to measure a rotational position of a rotor included in the electric motor, and to communicate the measured rotor position to the electronic controller.

15. A method of actuating a control valve, the method comprising:

providing a valve actuator comprising an electronic controller, an electric motor configured to cause a linear or rotational actuation of a valve according to a motor input received from the electronic controller, whereby application of said motor input to said electric motor determines a motor output force or torque that causes a valve force or torque to be applied to the valve, and a torque sensor configured to directly or indirectly measure the valve force or torque by measuring a sensed mechanical force or torque resulting from application of a voltage or electric current to the electric motor; and causing the electronic controller to:

A) store a motor configuration parameter set and a valve control requirement, wherein said valve control requirement includes a required force or torque to be applied to the valve;

B) according to the stored motor configuration parameter set, determine a predicted motor input that, when applied to the electric motor, is predicted to cause the required force or torque to be applied to the valve;

C) determine a predicted sensed force or torque that will be measured by the torque sensor when the required force or torque is applied to the valve;

D) apply the predicted motor input to the electric motor;

E) receive from the torque sensor a measured sensed force or torque;

F) compare the measured sensed force or torque with the predicted sensed force or torque; and G) if a difference between the measured sensed force or torque and the predicted sensed force or torque exceeds a specified limit, modify the stored motor configuration parameter set according to the difference between the measured sensed force or torque and the predicted sensed force or torque.

16. The method of claim 15, wherein the method further comprises causing the electronic controller to determine an initial motor control parameter set, said determination including sequentially applying a plurality of motor inputs to the electric motor, and for each of the applied motor inputs recording a corresponding sensed force or torque as measured by the torque sensor.

17. The method of claim 15, wherein the method further includes causing the electronic controller to periodically or continuously repeat steps B) through G) of claim 15.

18. The method of claim 17, further comprising determining by the electronic controller if the torque sensor has failed, and upon determining that the torque sensor has failed, continuing to repeat steps B) through D) of claim 15.

19. The method of claim 15, wherein the predicted motor input applied to the electric motor includes a current or voltage applied to the electric motor according to a current or voltage measurement provided by a current or voltage sensor, and wherein the method further comprises, upon detection that the current or voltage sensor has failed, implementing reactive control of the electric motor based on the measured sensed forces or torques.

\* \* \* \* \*